Patented Feb. 5, 1924.

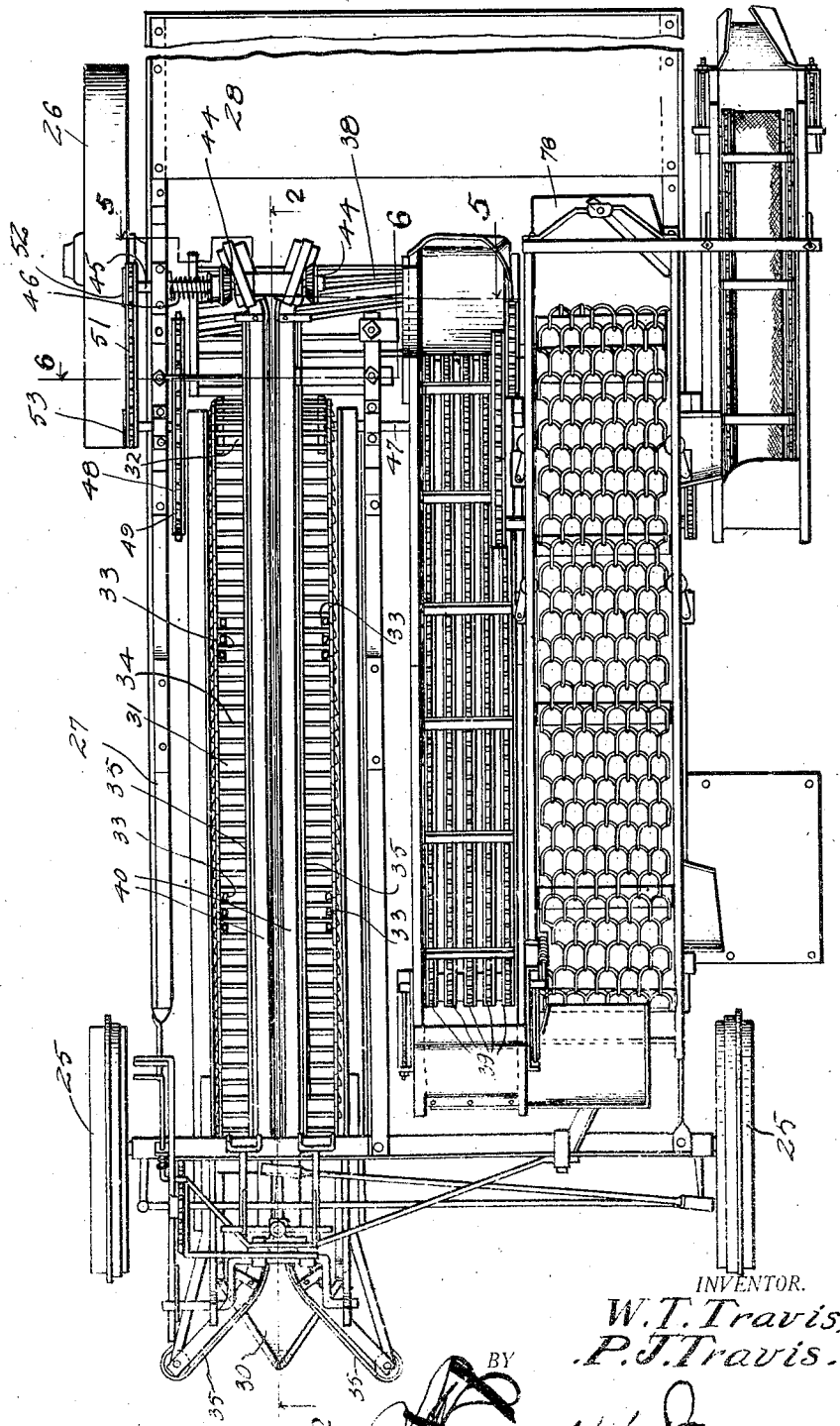

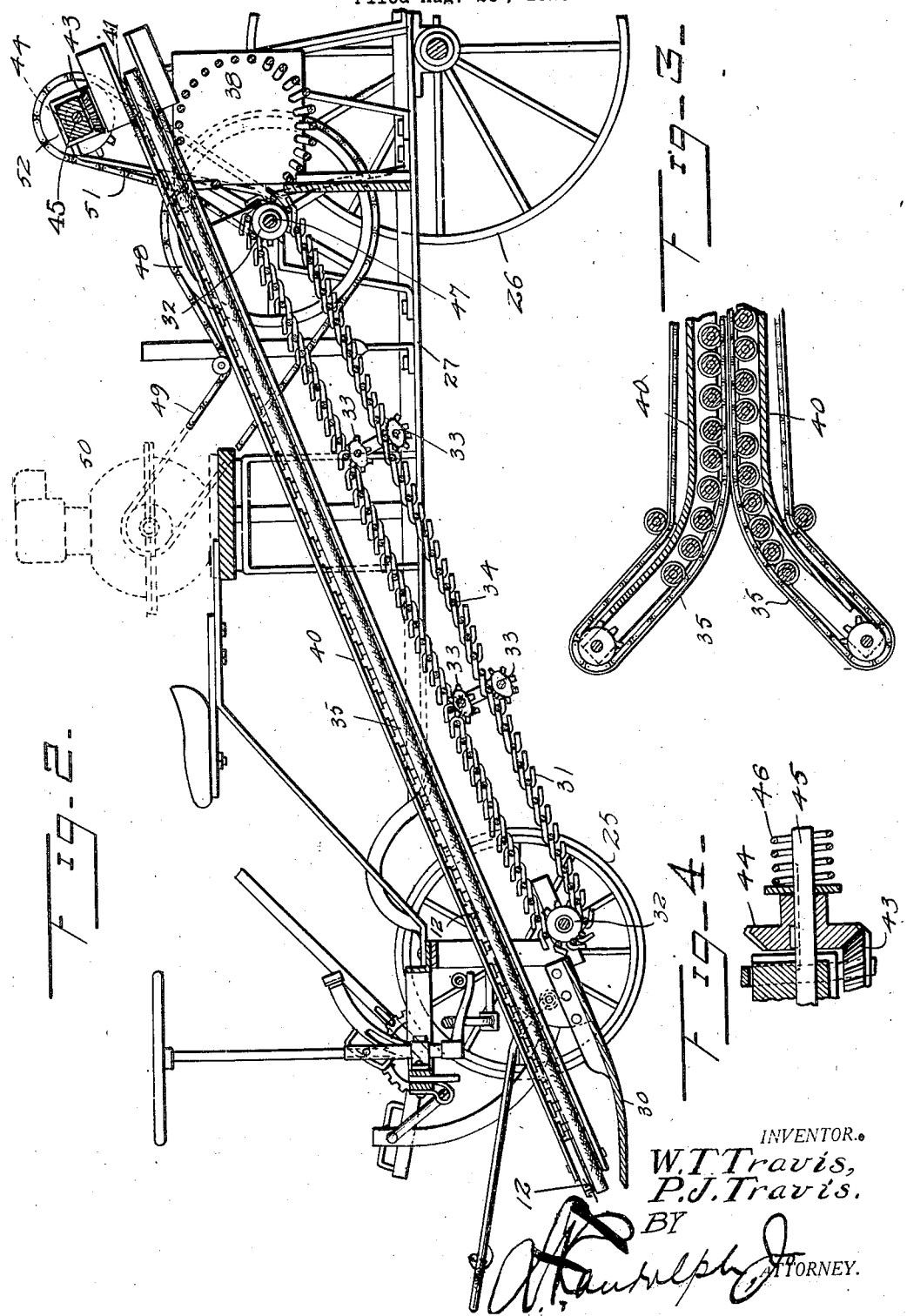

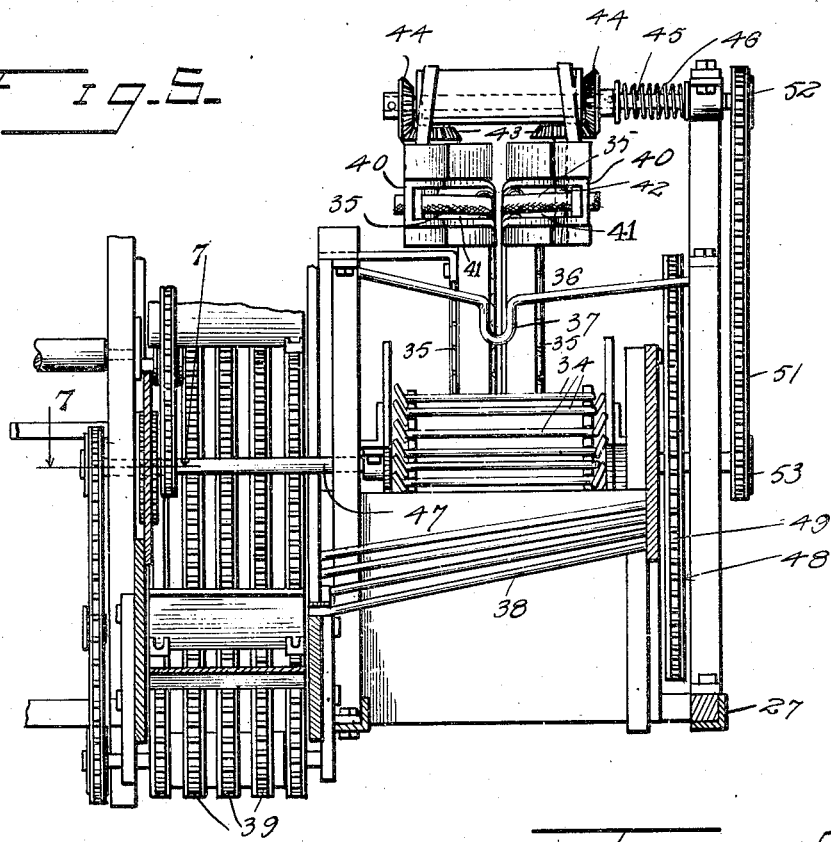
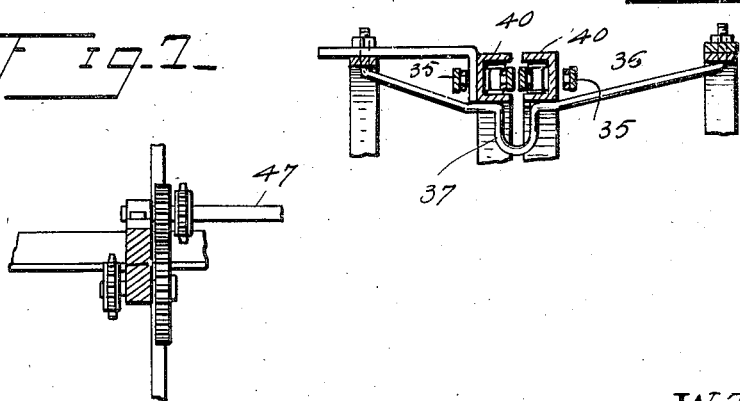

1,483,024

UNITED STATES PATENT OFFICE.

WILLIAM T. TRAVIS AND PAUL J. TRAVIS, OF OYSTER, VIRGINIA.

POTATO HARVESTER.

Application filed August 26, 1920. Serial No. 406,227.

*To all whom it may concern:*

Be it known that we, WILLIAM T. TRAVIS and PAUL J. TRAVIS, citizens of the United States, residing at Oyster, in the county of Northampton and State of Virginia, have invented certain new and useful Improvements in a Potato Harvester; and we do hereby declare the following to be a full, clear, and exact description of the invention, such as will enable others skilled in the art to which it appertains to make and use the same.

The object of the invention is to provide a relatively simple and efficient mechanism for effecting the complete harvesting of a potato crop,—that is to say under such conditions as to remove all of the potatoes from the soil, separating the tops or vines and the earth from the potatoes without the intervention of manual handling or treatment, as a means of minimizing the requirement of labor and insuring an accuracy in the harvesting of the products; and with this general object in view together with subordinate, correlative objects which will appear in the course of the following description, the invention consists in a construction, combination and relation of parts of which a preferred embodiment is shown in the accompanying drawings, it being understood that various changes in form, proportion, size and detail may be resorted to within the scope of the appended claims without departing from the principles involved.

In the drawings:—

Figure 1 is a plan view of the complete machine.

Figure 2 is a longitudinal section taken on the plane indicated by the line 2—2 of Figure 1.

Figure 3 is a detail longitudinal section of the lower end of the vine conveyor.

Figure 4 is a detail sectional view of the gearing at the upper end of the vine separator mechanism.

Figure 5 is a transverse sectional view taken in the plane of the transfer chute, between the upper end on the vine separating mechanism and the intermediate or dirt separator on the line 5—5 of Figure 1.

Figure 6 is a detail sectional view taken in the plane of the stripper on the line 6—6 of Figure 1.

Figure 7 is a detail sectional view of a portion of the motion transmitting gearing on the plane indicated by the line 7—7 of Figure 5.

The machine consists essentially of a plow or digger designed to follow the rows of potatoes, or crops of a like character and growth, that is of the tuber or bulbous variety or type under such conditions that all of the potatoes or other products are lifted bodily with the soil clinging thereto and the tops or vines and depositing them within reach of vine and earth separating mechanism by which the earth is loosened and caused to fall away from the potatoes while the vines or tops are grasped and carried to a point of discharge or deposit separate from the crop or product.

The machine is preferably provided with front and rear supporting wheels 25 and 26 for sustaining a suitable frame work indicated at 27 and having a rearwardly extending platform 28 that has suitable truss braces 29 to give it the necessary stability to support the weight imposed thereon. The plow or shovel 30, constituting the digger, may of course vary in shape and size to suit the peculiar conditions under which the harvester is operating, but should be of such dimensions as to insure the lifting of all of the potatoes or other products in the successive hills in which they are arranged in the row, said plow or shovel being arranged at the lower end of a conveyor 31 which is shown clearly in Figure 2 of the drawing to traverse terminal drums or rolls 32 and intermediate eccentric drums 33, preferably toothed so as to receive rotary motion from the conveyor and designed to impart a transverse vibration or agitation to the conveyor to cause the loosening of the earth from the potatoes and facilitate the dropping thereof between the transverse rods 34 of the conveyor to the ground. In this way the bulk of the earth raised by the plow or shovel with the potatoes is returned immediately to the row from which it has been removed while the potatoes are retained upon and carried by the conveyor to the upper end thereof.

Arranged above and substantially parallel with the conveyor 31 is a vine or top carrier consisting of parallel complemental of coacting belts 35 extending forward over the plow or shovel and designed to engage the tops or vines as the potatoes or other products are lifted from the soil and by holding said tops or vines as the potatoes traverse the conveyor, serve to separate the same from the potatoes, a stripper, shown in detail in Figure 6, being arranged near the upper end of the conveyor as indicated at 36, and consisting in the construction illustrated of a transverse bar having an intermediate loop 37 which serves to separate any potatoes from the vines should they remain attached thereto until they reach this point, to the end that the tops or vines may be carried over and beyond the transverse chute 38 at the upper end of the conveyor 31 and deposited upon the ground or in a suitable receptacle should it be preferred to furnish the same for the purpose. Said transfer chute is constructed of bars and is arranged in an inclined position for receiving the potatoes from the upper end of the conveyor and conducting them to the lower end of the intermediate or cleaning conveyor 39.

The endless belts constituting the top or vine carrier are arranged to traverse channeled guides 40 which serve to protect the same and hold them in proper engaging relation with the tops or vines, the sprockets 41 at the upper end of the vine carrier, and around which the belts extend, having vertical shafts 42 provided with bevel gears 43 engaged by beveled gears 44 on a transverse spindle 45, and one of said shafts 42 being transversely movable to accommodate the varying thicknesses of the tops or vines, and a spring 46 being mounted in operative relation with the corresponding bevel gear 44 to yieldingly hold the parts in operative relation while permitting a sufficient separation of the carrier belts to prevent straining or choking.

The rear upper drum 32 traversed by the conveyor 31 is carried by a drive shaft 47 to which is attached a drive wheel 48 receiving motion from the chain 49 actuated by the motor, indicated at 50, and the shaft 45 receives motion from the drive shaft through a chain 51 traversing sprocket wheels 52 and 53 attached respectively to said shafts.

In the operation of the mechanism as described, it will be understood that the digging and conveying of the potatoes is continuous. As the product traverses the main separating conveyor which receives the same from the plow or digger, the earth is separated therefrom and dropped through the conveyor to the furrow from which the same has been removed, and the vines or tops are separated and discharged independently. The product thus handled is in a practically clean condition and therefor is deposited in a marketable condition without intermediate manipulation or handling.

Having thus described the invention, what we claim is:—

1. A potato harvester having a digger and a vine and earth separator consisting of a potato supporting conveyor and a superjacent vine engaging and advancing carrier, and a transverse stripper having a potato engaging loop for detaching potatoes from the vines.

2. A potato harvester including a movably mounted frame, a plow carried by said frame, a conveyor carried by the frame and receiving vines bearing the potatoes from the plow, a vine engaging and advancing carrier mounted on the frame and disposed over the plow and the first conveyor, and loop means fixed to abut and detach the potatoes from the vines.

3. A potato harvester having a digging and conveying means for the vines bearing the potatoes, and a stripper member disposed in the path of advance of the vines and having an offset to directly abut the potatoes and strip them from the vines.

4. A potato harvester including a supporting device and a plow carried by the forward portion thereof, an inclined chute located at the rear end of the supporting device in a plane above the plow, a conveyor for carrying potatoes from the plow to said chute, and a vine conveyor extending beyond each end of the potato conveyor and at one end rearwardly of and above the mouth of the chute, and a stripper loop for removing potatoes from the vines located between the rear ends of said conveyors and adjacent the mouth of the chute.

In testimony whereof we affix our signatures in presence of two witnesses.

WILLIAM T. TRAVIS.
PAUL J. TRAVIS.

Witnesses:
OTHO F. MEARS,
L. H. MEARS.